US012499495B2

(12) United States Patent
Shao et al.

(10) Patent No.: US 12,499,495 B2
(45) Date of Patent: Dec. 16, 2025

(54) METHODS AND INTERNET OF THINGS (IOT) SYSTEMS FOR GAS METER MANAGEMENT BASED ON SMART GAS PLATFORMS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Junyan Zhou, Chengdu (CN); Feng Wang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 96 days.

(21) Appl. No.: 18/530,161

(22) Filed: Dec. 5, 2023

(65) Prior Publication Data
US 2024/0112286 A1    Apr. 4, 2024

(30) Foreign Application Priority Data

Oct. 12, 2023   (CN) .......................... 202311321661.X (51) Int. Cl.
*G06Q 50/06* (2024.01)
*H04L 67/12* (2022.01)

(52) U.S. Cl.
CPC ............ *G06Q 50/06* (2013.01); *H04L 67/12* (2013.01); *H04Q 2209/10* (2013.01); *H04Q 2209/40* (2013.01); *H04Q 2209/60* (2013.01)

(58) Field of Classification Search
CPC .......... G06Q 50/06; H04L 67/12; G01D 4/00; G01D 4/002; G01D 4/004; G01D 2204/10; G01D 2204/12; G01D 2204/18; G01D 2204/20; G01D 2204/22; G01D 2204/26; G01D 2204/30; G01D 2204/40; G01D 2204/43; G01D 2204/47; H04Q 9/00;

(Continued)

(56) References Cited

U.S. PATENT DOCUMENTS

| 6,842,776 B1* | 1/2005 | Poisner ............. G05B 23/0213 700/12 |
| 9,644,992 B2* | 5/2017 | Wada ....................... H04Q 9/00 |
| 2020/0272177 A1* | 8/2020 | Shao ................... G05D 7/0635 |

FOREIGN PATENT DOCUMENTS

CN         114925791 A      8/2022

* cited by examiner

*Primary Examiner* — Franklin D Balseca
(74) *Attorney, Agent, or Firm* — METIS IP LLC (57) ABSTRACT

Methods and Internet of Things (IoT) systems for gas meter management based on a smart gas platform are provided. The method is implemented based on a smart gas device management platform of the IoT system for smart gas meter management, and the method comprises: obtaining traceability information and user information of a gas meter, the traceability information at least including active data and the active data being related to a gas meter management operation performed on the gas meter; in response to the active data satisfying a preset condition, generating warning information and sending the warning information to at least one associated platform of the IoT system for smart gas meter management; in response to receiving request information of a user, retrieving associated traceability information of the gas meter based on the request information, the traceability information, and the user information; and pushing the associated traceability information to the user.

20 Claims, 5 Drawing Sheets

(58) Field of Classification Search
CPC ........... H04Q 2209/00; H04Q 2209/10; H04Q 2209/40; H04Q 2209/60; H04Q 2209/70; H04Q 2209/80
See application file for complete search history.

METHODS AND INTERNET OF THINGS (IOT) SYSTEMS FOR GAS METER MANAGEMENT BASED ON SMART GAS PLATFORMS

CROSS-REFERENCE TO RELATED APPLICATION

This application claims priority of Chinese Patent Application No. 202311321661.X, filed on Oct. 12, 2023, the contents of which are entirely incorporated herein by reference.

TECHNICAL FIELD

The present disclosure relates to the technical field of gas meter management, and in particular, relates to methods and IoT system (IoT) systems for gas meter management based on a smart gas platform.

BACKGROUND

The widespread use of gas puts forward higher requirements for gas meter management technology. In the smart gas system, a count of gas meters is huge, a large number of devices interact, and the gas meters are distributed in scattered locations. In the process of gas meter installation, usage, repair, and lifespan assessment, there is problem such as low efficiency and high error rate with the traditional manual management manner. The traditional manner lacks an integrated management scheme for an entire life cycle of the gas meter and an entire process after scrapping, which may not satisfy the enterprise's integrated management of the gas meter.

Patent Application CN 114925791A discloses a system and method for Internet of Things (IoT) ultrasonic gas meter full life cycle management. Various information of the IoT ultrasonic gas meter is obtained in real time through Radio Frequency Identification (RFID) electronic tags using a RFID read/write device, and real-time identification and tracking, operation data collection, and automatic verification operation control are performed on the IoT ultrasonic gas meter, which realizes real-time synchronization of information and improves the management efficiency of the IoT ultrasonic gas meter, and reduces the error rate of management. However, in the process of the use of RFID device, certain human intervention (e.g., information inputting) is still required, and there are human errors and device failure problems, and the subsequent traceability query process is relatively complicated.

Therefore, it is desirable to provide methods and IoT systems for gas meter management based on a smart gas platform to realize automatic integrated management of the gas meter and provide a direction for traceability querying of data at the same time.

SUMMARY

One of the embodiments of the present disclosure provides a method for gas meter management based on a smart gas platform. The method is implemented based on a smart gas device management platform of an Internet of Things (IoT) system for smart gas meter management, and the method comprises: obtaining traceability information and user information of a gas meter, the traceability information at least including active data and the active data being related to a gas meter management operation performed on the gas meter; in response to receiving request information of a user, retrieving associated traceability information of the gas meter based on the request information, the traceability information, and the user information; and pushing the associated traceability information to the user.

One of the embodiments of the present disclosure provides an Internet of Things (IoT) system for smart gas meter management. The IoT system comprises a smart gas user platform, a smart gas service platform, a smart gas device management platform, a smart gas sensing network platform, and a smart gas object platform. The smart gas device management platform is configured to obtain traceability information and user information of a gas meter, the traceability information at least including active data and the active data being related to a gas meter management operation performed on the gas meter, in response to the active data satisfying a preset condition, generate warning information and send the warning information to at least one associated platform of the IoT system for smart gas meter management, in response to receiving request information of a user, retrieve associated traceability information of the gas meter based on the request information, the traceability information, and the user information, and push the associated traceability information to the user.

One of the embodiments of the present disclosure provides a non-transitory computer-readable storage medium storing computer instructions. When reading the computer instructions in the non-transitory computer-readable storage medium, a computer executes the method for gas meter management based on a smart gas platform.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

There is a lack of integrated management solutions for an entire life cycle of a gas meter and an entire process after scrapping in the gas meter management technology, which may lead to problems such as non-standard gas meter management, increased difficulty in tracing failures/problems, increased management costs and not satisfy the enterprise's integrated management of the gas meter.

In view of the foregoing, in some embodiments of the present disclosure, methods and Internet of Things (IoT) systems for gas meter management based on a smart gas platform, which realizes an integrated management of the manufacture-ex-factory-installation and usage-repair and replacement-scrapping and recycling of the gas meter. At the same time, for the gas meter-related problems that have occurred or may occur, data support and a direction of the data traceability query are provided, so that the gas meter may be traced from the manufacture to the replacement and scrapping, and the query manner is simple and easy, which improves the efficiency of solving gas meter-related problems.

Figure 1:
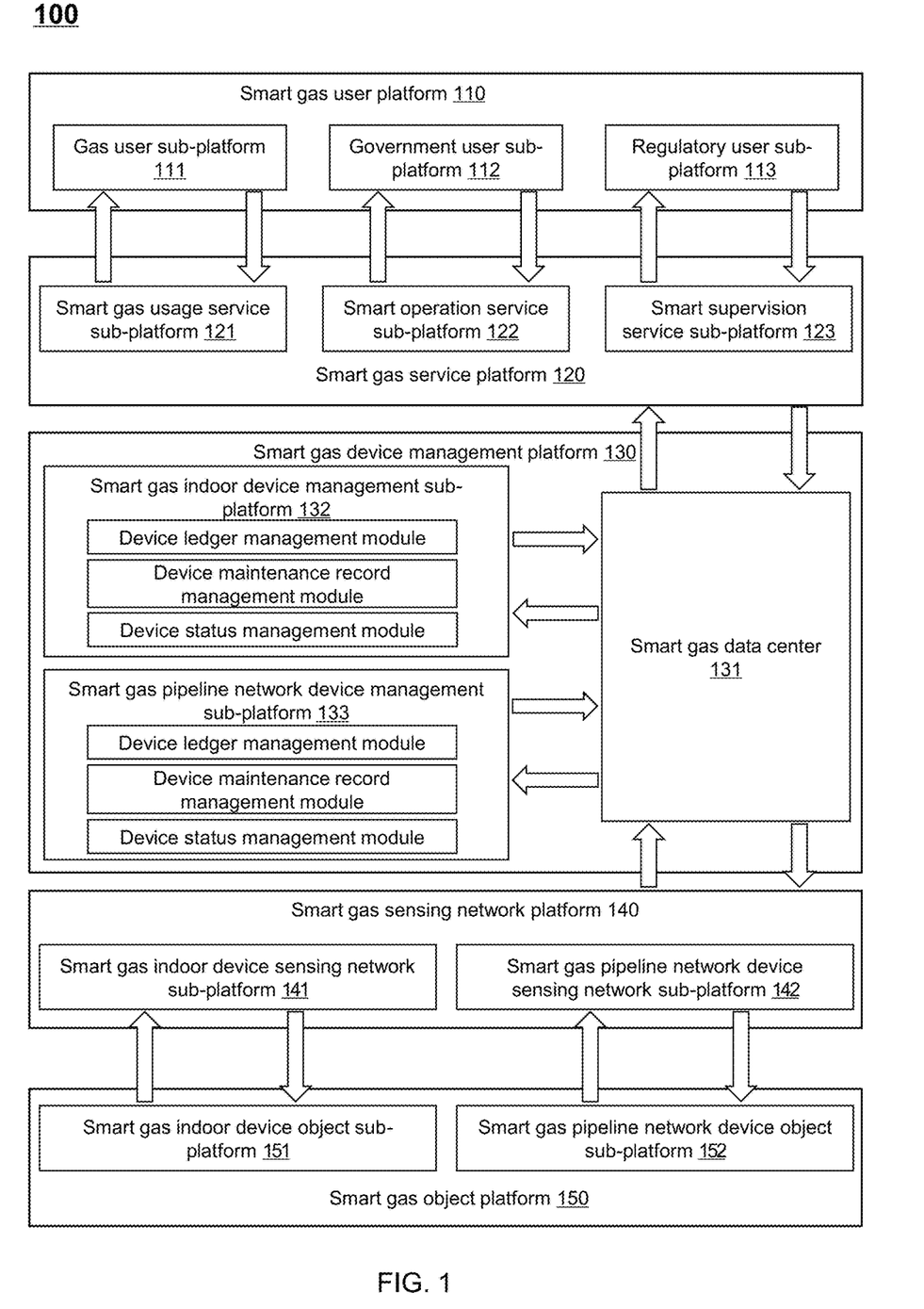
FIG. 1 is a structural diagram of an exemplary platform of an Internet of Things (IoT) system for smart gas meter management according to some embodiments of the present disclosure.

FIG. 1 is a structural diagram of an exemplary platform of an Internet of Things (IoT) system for smart gas meter management according to some embodiments of the present disclosure. As shown in FIG. 1, the IoT system 100 for smart gas meter management may include a smart gas user platform 110, a smart gas service platform 120, a smart gas device management platform 130, a smart gas sensing network platform 140, and a smart gas object platform 150.

The smart gas user platform 110 refers to a platform for interacting with a user. In some embodiments, the smart gas user platform may be configured as a terminal device.

In some embodiments, the smart gas user platform 110 may include a gas user sub-platform 111, a government user sub-platform 112, and a regulatory user sub-platform 113.

The gas user sub-platform 111 refers to a platform that provides the gas user with data related to gas usage and solutions to gas problems. The gas user may include an industrial gas user, a commercial gas user, a general gas user, etc.

The government user sub-platform 112 refers to a platform that provides data related to gas operation for a government user. The government user may include a manager (e.g., maintenance personnel) of a gas operation entity, etc.

The regulatory user sub-platform 113 refers to a platform used for the supervisory user to supervise the operation of the entire IoT system. The supervisory user may include a member of a safety management department, etc.

The smart gas service platform 120 refers to a platform for receiving and transmitting data and/or information.

In some embodiments, the smart gas service platform may include a smart gas usage service sub-platform 121, a smart operation service sub-platform 122, and a smart supervision service sub-platform 123.

The smart gas usage service sub-platform 121 refers to a platform that provides the gas user with information related to a gas device. In some embodiments, the gas device includes a gas meter.

The smart operation service sub-platform 122 refers to a platform that provides the government user with information related to gas operation.

The smart supervision service sub-platform 123 refers to a platform that provides the supervisory user with information related to safety supervision.

The smart gas device management platform 130 refers to a platform that coordinates and plans a connection and a collaboration between various functional platforms as a whole. In some embodiments, the smart gas device management platform may dynamically update traceability information of the gas meter.

In some embodiments, the smart gas device management platform 130 may include a smart gas data center 131, a smart gas indoor device management sub-platform 132, and a smart gas pipeline network device management sub-platform 133.

The smart gas data center 131 is used to store and manage operational information. In some embodiments, the smart gas data center may be configured as a storage device for storing and managing the traceability information, user information, etc. of the gas meter.

The smart gas indoor device management sub-platform 132 refers to a platform used to process information related to an indoor device.

The smart gas pipeline network device management sub-platform 133 is a platform used to process information related to a pipeline network device.

In some embodiments, the smart gas pipeline network device management sub-platform and the smart gas pipeline network device management sub-platform include, but are not limited to, a device ledger management module, a device maintenance record management module, and a device status management module, respectively.

The device ledger management module is used to realize diversified categorization management (e.g., categorization by category, categorization by region, etc.) of devices. In some embodiments, the device ledger management module may extract the traceability information, the user information, etc. of the gas meter from the data center and put the traceability information, the user information, etc. of the gas meter into the operational information.

The device maintenance record management module is used for information management and recording during device upgrade and/or maintenance. In some embodiments, the device maintenance record management module may extract the gas meter maintenance-related data and record information from the data center.

The device status management module is used to manage information related to a device status (e.g., a current operating status or an expected service life of the device).

The smart gas sensing network platform 140 refers to a functional platform for managing sensing communication. In some embodiments, the smart gas sensing network platform may be configured as a communication network and gateway.

In some embodiments, the smart gas sensing network platform may include a smart gas indoor device sensing network sub-platform 141 and a smart gas pipeline network device sensing network sub-platform 142.

The smart gas indoor device sensing network sub-platform 141 is used to obtain relevant information of a gas indoor device and may interact with a smart gas indoor device object sub-platform.

The smart gas pipeline network device sensing network sub-platform 142 is used to obtain relevant information of a gas pipeline network device and may interact with a smart gas pipeline network device object sub-platform.

The smart gas object platform 150 refers to a functional platform for obtaining perceptual information. In some embodiments, the smart gas object platform may be configured as various types of devices. The various types of devices include the gas device (e.g., the indoor device and the pipeline network device) and other devices (e.g., a monitoring device).

In some embodiments, the smart gas object platform 150 may include, but is not limited to, the smart gas indoor device object sub-platform 151 and the smart gas pipeline network device object sub-platform 152.

In some embodiments, the smart gas indoor device object sub-platform 151 may be configured as various types of gas indoor devices of the gas user, for example, the gas meter of the gas user.

In some embodiments, the smart gas pipeline network device object sub-platform 152 may be configured as various types of pipeline network devices and monitoring devices. The pipeline network device may include a gas gate station compressor, a gas flow meter, a valve control device, etc. The monitoring device may include a temperature sensor, a pressure sensor, etc.

In some embodiments, the smart gas indoor device sensing network sub-platform 141 may obtain the traceability information and the user information of the gas meter from the smart gas indoor device object sub-platform 151 and upload the traceability information and the user information of the gas meter to the smart gas data center 131 of the smart gas device management platform. The maintenance personnel may obtain the user information through the smart gas data center.

In some embodiments, the smart gas service platform 120 may receive request information of a user from the smart gas user platform 110 and upload the request information to the data center 131 of the smart gas device management platform.

In some embodiments, the smart gas device management platform 130 may push associated traceability information and warning information to the smart gas service platform 120 and upload the associated traceability information and warning information to the smart gas user platform 110 via the smart gas service platform.

More descriptions may be found in FIGS. 2-5 and related descriptions thereof.

It should be noted that the above description of the system and components thereof is merely provided for convenience of illustration, and does not limit the present disclosure to the scope of the embodiments.

Figure 2:
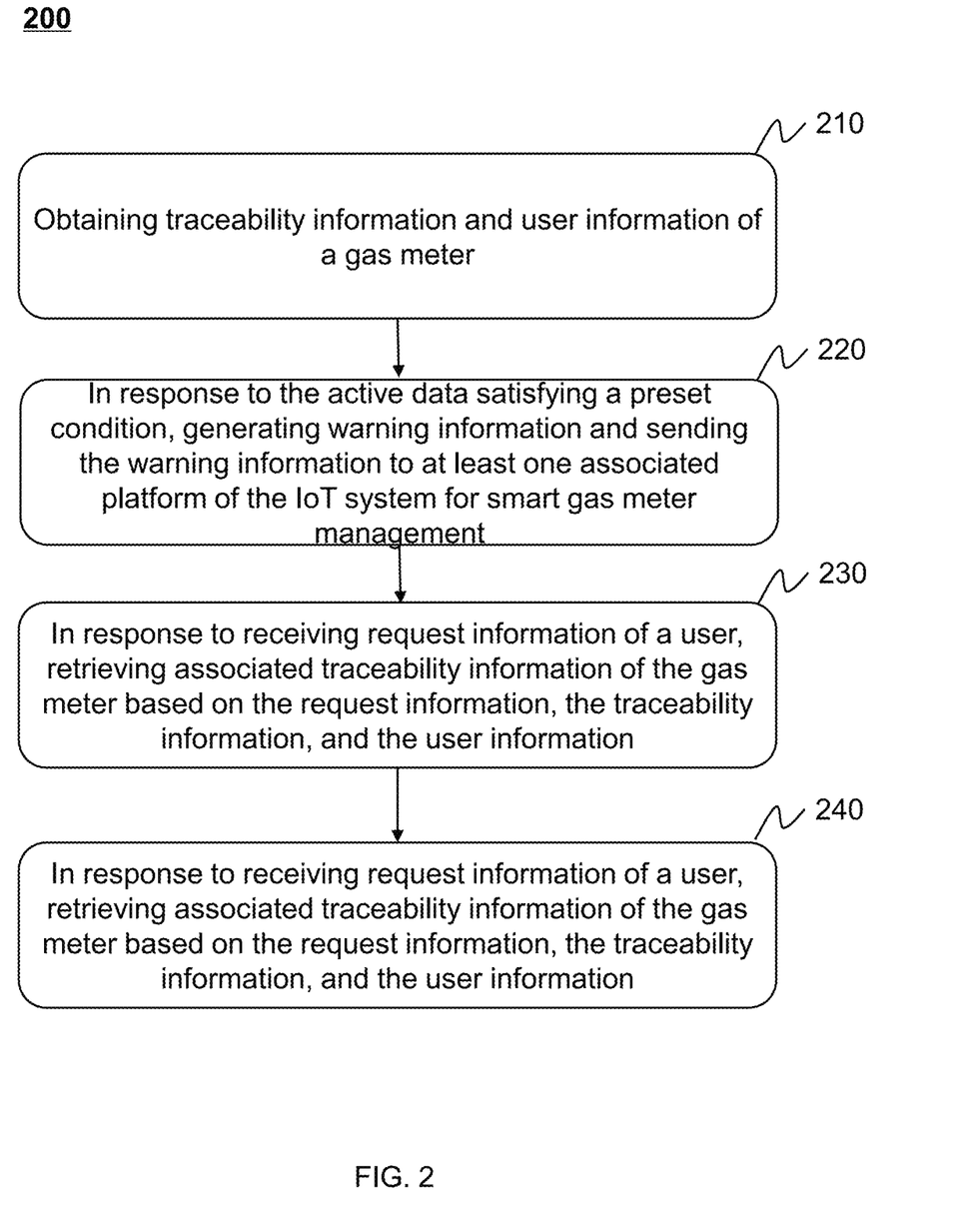
FIG. 2 is a flowchart of an exemplary process of a method for gas meter management according to some embodiments of the present disclosure.

FIG. 2 is a flowchart of an exemplary process of a method for gas meter management according to some embodiments of the present disclosure. In some embodiments, the process 200 may be performed by the smart gas device management platform 130. As shown in FIG. 2, process 200 includes the following operations.

In 210, obtaining traceability information and user information of a gas meter.

The traceability information refers to information and data related to the gas meter. In some embodiments, the traceability information includes all relevant information generated by the gas meter from ex-factory. For example, the traceability information may include information related to gas meter installation, relocation, repair, meter reading, etc. The traceability information may be used as data support during management of the gas meter.

In some embodiments, the traceability information may be obtained from a smart gas indoor device sensing network sub-platform based on a smart gas data center of a smart gas device management platform.

In some embodiments, the traceability information at least includes active data. The active data refers to time data corresponding to relevant traceability information.

In some embodiments, the active data is related to a gas meter management operation performed on the gas meter. The gas meter management operation refers to an operation performed when the gas meter is managed. The gas meter management operation may at least include an operation such as ex-factory, installation, usage, maintenance, replacement, or inquiry of the gas meter. Accordingly, the active data may include a time when relevant data such as ex-factory, installation, usage, repair, replacement, query, etc. of the gas meter is generated.

The user information is information related to the gas user. In some embodiments, the user information may include gas usage user information and gas operation user information.

The gas usage user information may include a category of the user, a count of users, etc. The category of the user may include a resident, a merchant, a factory, etc.

The gas operation user information may include a type, level, etc., of the management maintenance personnel. The level may at least characterize experience of the maintenance personnel.

In some embodiments, the smart gas device management platform may obtain the user information in various ways. For example, the smart gas device management platform may obtain the gas usage user information from the smart gas indoor device object sub-platform through the smart gas indoor device sensing network sub-platform. As another example, the smart gas device management platform may obtain the gas operation user information through the data center.

In 220, in response to the active data satisfying a preset condition, generating warning information and sending the warning information to at least one associated platform of the IoT system for smart gas meter management.

In some embodiments, the smart gas device management platform may determine whether there is a lack of the active data through the preset condition. The preset condition may include whether there is a lack of preset necessary active data. The necessary active data may correspond to different gas meter management operations, which may be set as required. For example, the necessary active data corresponding to the meter reading operation may include an ex-factory time, an installation time, a commissioning time, etc.

In some embodiments, the smart gas device management platform may determine whether there is a lack of the active data by checking the integrity of necessary active data before each active data.

Since a large data volume of the traceability information, directly judging the traceability information may cause a computing load of the platform. The active data merely contains time and type, and a data volume of the active data is relatively small. Therefore, whether there is a lack of the active data is determined, which reduces the amount of computation and reduces the computing load of the smart gas device management platform.

The warning information refers to warning information used to indicate that the active data is abnormal. In some embodiments, the smart gas device management platform 130 may generate the warning information in response to the active data satisfying the preset condition. For example, the smart gas device management platform 130 may generate the warning information based on the lack of the active data. In some embodiments, the smart gas device management platform may send the warning information to the at least one associated platform of the IoT platform for smart gas meter management through text, voice, etc.

The associated platform refers to a platform associated with the generation of traceability information. In some embodiments, the associated platform may include a sub-platform of the smart gas user platform, a sub-platform of the smart gas object platform, etc. For example, if there is a lack of active data of a certain routine inspection, the warning information is sent to the sub-platform of the smart gas user platform, the sub-platform of the smart gas object platform, etc. that is associated with the inspection.

In 230, in response to receiving request information of a user, retrieving associated traceability information of the gas meter based on the request information, the traceability information, and the user information.

The request information refers to an instruction that the user expects to view the traceability information. The request information may include content of a request of the gas user requesting to view the traceability information. For example, the request information includes a purpose of viewing the traceability information, a type of viewed traceability information, a time range of viewing, etc.

The associated traceability information refers to traceability information that is related to the request information of the user.

In some embodiments, the smart gas device management platform may retrieve the associated traceability information in the smart gas data center based on the request information, the traceability information, and the user information through a machine learning algorithm. The machine learning algorithm may include a text categorization algorithm, a topic modeling algorithm, a similarity matching and retrieval algorithm, etc.

In 240, pushing the associated traceability information to the user.

In some embodiments, the smart gas device management platform may push the associated traceability information in various ways. For example, a pushing order of the associated traceability information may be determined based on a time order of the associated traceability information. For example, latest associated traceability information is pushed first, etc.

In some embodiments, the smart gas device management platform may also push the associated traceability information based on an association degree of the associated traceability information. More descriptions may be found in FIG. 5 of the present disclosure and related descriptions thereof.

In some embodiments of the present disclosure, the method for gas meter management may reflect a state of the gas meter of each time period, which provides the data support and direction for data traceability query for the gas meter-related problems that have occurred or may occur. Whether there is a lack of the traceability information may be determined through the active data, which reduces the computing load caused by the large data volume of the traceability information.

It should be noted that the description of the process is merely for the purpose of example and illustration and does not limit the scope of application of the present disclosure. For those skilled in the art, various modifications and changes to the process may be made under the guidance of the present disclosure. However, these modifications and changes remain within the scope of the present disclosure.

Figure 3:
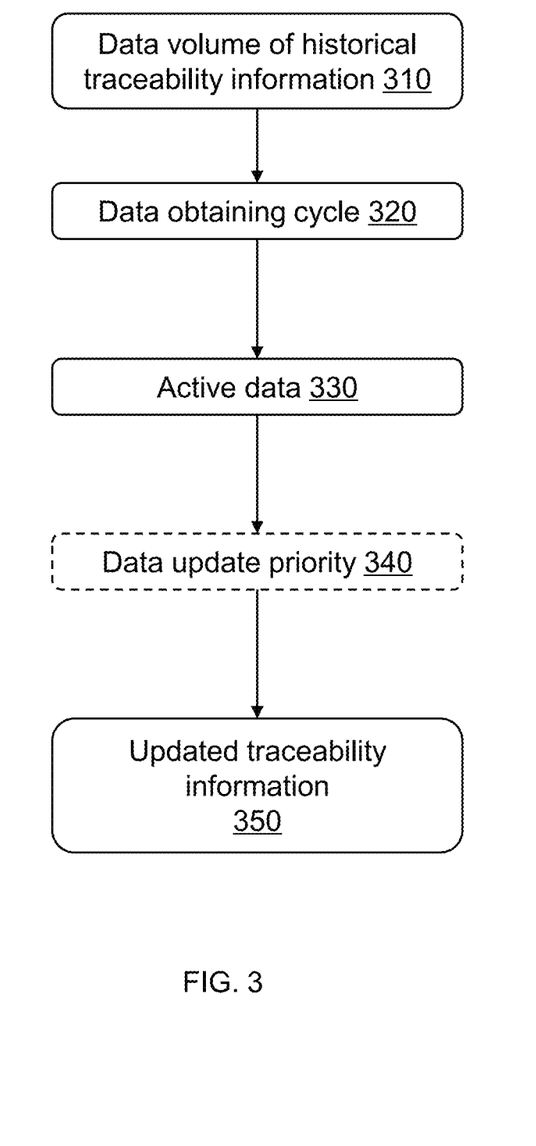
FIG. 3 is a schematic diagram of dynamically updating traceability information according to some embodiments of the present disclosure.

FIG. 3 is a schematic diagram of dynamically updating traceability information according to some embodiments of the present disclosure. As shown in FIG. 3, the dynamically updating the traceability information includes at least the following descriptions.

In some embodiments, the traceability information may be dynamically updated based on a gas platform. Specifically, the smart gas device management platform may determine a data obtaining cycle 320 based on a data volume of historical traceability information 310 of the gas meter. In conjunction with the data obtaining cycle 320, the smart gas device management platform obtains active data 330 of the gas meter based on the gas device management platform. The smart gas device management platform may update, based on the active data 330, the traceability information to determine updated traceability information 350.

The historical traceability information refers to all traceability information in historical time.

The data obtaining cycle refers to a time period in which the traceability information is obtained. In some embodiments, the data obtaining cycle may be determined based on a data volume of the historical traceability information. The larger the data volume, the shorter the data obtaining cycle.

In some embodiments, the smart gas device management platform may obtain the active data once per data obtaining cycle. For example, the smart gas device management platform may obtain latest active data based on a system timestamp or log record of the most recently updated traceability information.

In some embodiments, the smart gas device management platform may update the traceability information based on the active data in various ways. For example, the smart gas device management platform may directly look up the traceability information corresponding to the active data, and update the traceability information corresponding to the active data to the smart gas data center as new traceability information. As another example, the smart gas device management platform may determine an update rule based on the active data and update the traceability information in an update order.

In some embodiments of the present disclosure, the traceability information is dynamically updated, which ensures the validity of the data to solve the traceability problem in a timely manner, and the data obtaining cycle is determined based on the data volume, which avoids the accumulated data volume from being too large and increasing the platform's computing pressure.

In some embodiments, the smart gas device management platform may determine, based on the active data 330, a data update priority 340 of the gas meter, and update, based on the data update priority 340, the traceability information of the gas meter to determine the updated traceability information 350.

The data update priority refers to a priority in which the traceability information is updated. In some embodiments, the data update priority may be represented by different numbers or phrases reflecting degrees. For example, a numerical value between 1-10 may be used to represent the data update priority. The smaller the value, the higher the data update priority, and the more the corresponding data that needs to be updated first. As another example, the data update priority may be represented by high, relatively high, medium, low, and relatively low.

In some embodiments, the smart gas device management platform may determine the data update priority based on the active data in various ways. For example, the smart gas device management platform may determine the update priority based on an amount of active data. The more the active data of the gas meter is, and the more the operations are performed on the gas meter, the more the traceability information is needed as the data support, and the higher the data update priority of the gas meter is.

In some embodiments, the smart gas device management platform may also determine data update priority of the gas meter based on an active feature corresponding to the gas meter. More descriptions may be found in FIG. 4 of the present disclosure and related descriptions thereof.

In some embodiments, the smart gas device management platform may update the traceability information of the gas meter based on the data update priority in various ways. For example, a corresponding update strategy may be developed based on the update priority. Exemplarily, the update strategy may be set to trigger the update of traceability information with a high priority based on a preset periodic or real-time checking mechanism. At the same time, data with a medium priority and data with a low priority may be set to be updated accordingly, such as daily, weekly, or monthly.

In some embodiments of the present disclosure, the traceability information is updated by updating the priority, which ensures the timeliness and accuracy of the key data, thereby efficiently providing the user with the data and optimizing the user experience.

Figure 4:
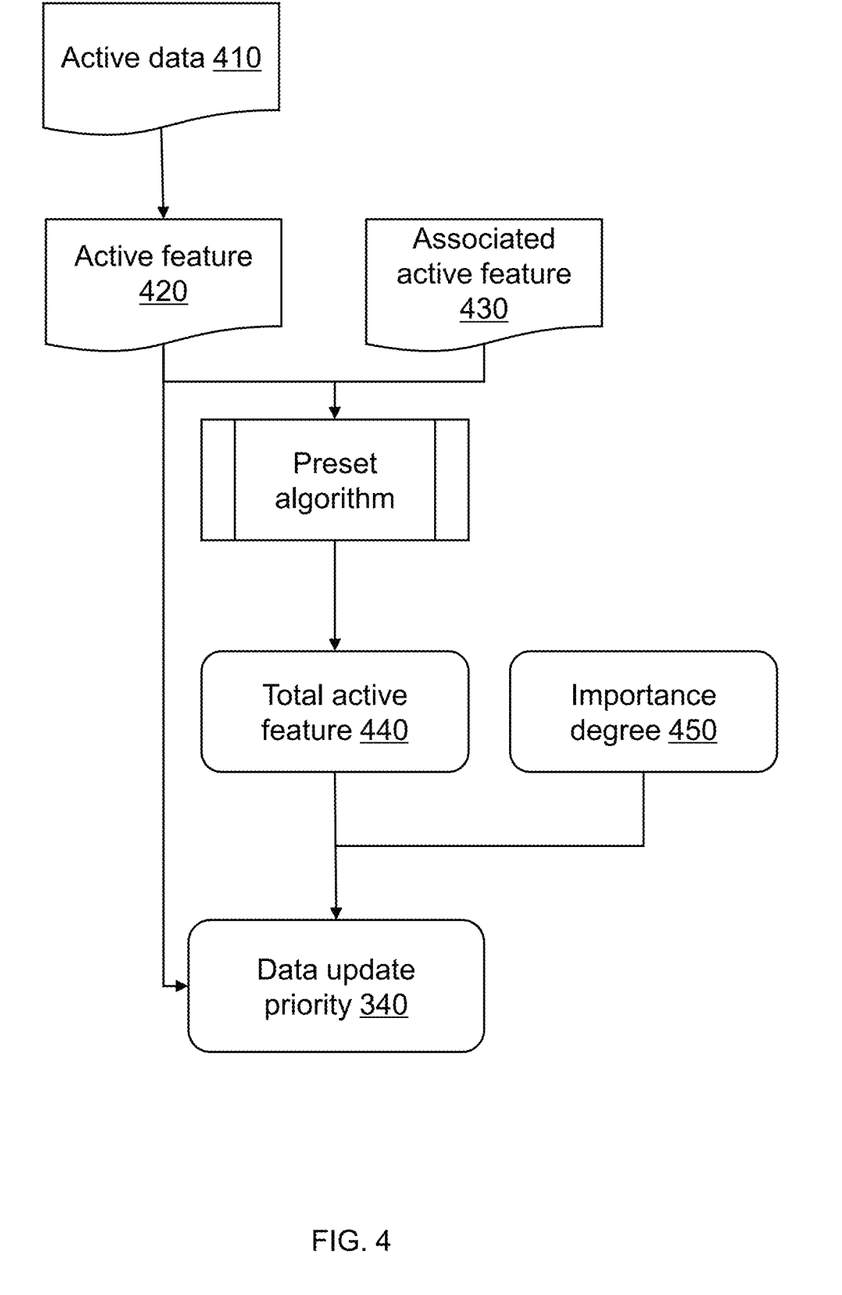
FIG. 4 is a schematic diagram for determining a data update priority of a gas meter according to some embodiments of the present disclosure.

FIG. 4 is a schematic diagram for determining a data update priority of a gas meter according to some embodiments of the present disclosure.

In some embodiments, the smart gas device management platform may extract an active feature 420 in the active data based on the active data 410, and determine the data update priority 340 of the gas meter based on the active feature 420.

The active feature refers to a relevant feature corresponding to relevant traceability information generated by the gas meter. In some embodiments, the active feature may characterize a time feature of the gas meter management operation performed on the gas meter. For example, the active feature may include a feature such as a frequency, a time interval, etc. of different operations performed on the gas meter, respectively.

In some embodiments, the association degrees between the different operations corresponding to the active feature and the traceability information requested to be viewed are different. A type of operation that has a relatively high recent active feature may be related to a purpose of viewing of the traceability information this time. For example, inspections are frequently performed recently, which may be due to a recent relatively high failure rate of this batch of gas meters, and the purpose of viewing of the traceability information this time is to analyze a reason of the high failure rate, so the association degree of the relevant traceability information of the inspections may be relatively high.

In some embodiments, the smart gas device management platform may extract the active feature 420 in the active data 410 based on a preset rule. The preset rule may be to make statistics on the frequency and time interval of the operation. When the operation performed on the gas meter includes a target operation, the time corresponding to the target operation in the active data may be summarized and analyzed to obtain the frequency and time interval of the target operation, so as to obtain the active feature. The target operation may be any one of the gas meter management operations.

In some embodiments, the active feature 420 may be represented using a vector or a group of vectors. For example, when the operation performed on the gas meter includes n different operations, the active feature may be represented as $[(f_1, t_1), \ldots, (f_n, t_n)]$, where $f_n$ denotes the frequency of operation n, and $t_n$ denotes the time interval of operation n.

In some embodiments, the active feature 420 may also be represented in other forms, which may be determined according to actual needs.

In some embodiments, the smart gas device management platform may determine the data update priority 340 of the gas meter based on the active feature 420 and an importance degree of the operation performed on the gas meter.

The importance degree 450 may characterize a degree of influence of the gas meter management operation on the gas meter. In some embodiments, the importance degree of a certain gas meter management operation may be determined based on whether usage of the gas meter may be influenced if the operation is not performed. For example, a meter reading operation has a relatively low impact on the gas meter, and a maintenance operation has a relatively high impact on the gas meter. In some embodiments, the importance degree may be expressed using a numerical value. The larger the numerical value, the higher the importance degree.

In some embodiments, the priority may be determined by a preset rule based on the importance degree and the active feature of the operation. The preset rule may be a priority $R=\Sigma P_i \times f_i/t_i$, where P denotes the importance degree of the operation, i denotes an operation type number, f denotes a frequency feature of generating the operation, and t denotes the time interval at which the operation is performed.

In some embodiments, the preset rule may also include other descriptions, which may be set according to actual needs.

In some embodiments, the data update priority is also related to an associated active feature 430 of an associated gas meter.

The associated gas meter may be another gas meter associated with a current gas meter (i.e., the gas meter that is being managed). For example, the associated gas meter may at least include a gas meter of a same batch as the current gas meter, a gas meter in a same region as the current gas meter, etc.

In some embodiments, the associated gas meter may be determined based on at least one of a position of the current gas meter and a production batch of the current gas meter. For example, the associated gas meter may be determined based on the position of the current gas meter. A gas meter within a preset distance from a geographic position of the current gas meter may be determined as the associated gas meter. The preset distance may be 1 kilometer, 5 kilometers, etc. As another example, the associated gas meter may be determined based on the production batch of the current gas meter. A gas meter of the same batch as the current gas meter may be determined as the associated gas meter. The gas meter of the same batch refers to a gas meter produced in the same batch as the current gas meter.

The associated active feature refers to a relevant feature corresponding to relevant traceability information generated for the associated gas meter. In some embodiments, the associated active feature characterizes a feature such as the frequency, time interval, etc. of different gas meter management operations performed on the associated gas meter, respectively.

In some embodiments, the associated active feature 430 may be extracted from the active data of the associated gas meter in a similar way of extracting the active feature of the latest active data of the gas meter, which may be found above.

In some embodiments, the associated active feature 430 of the associated gas meter may be related to an operating feature vector of each associated gas meter. In some embodiments, the operating feature vector of the gas meter may be determined based on gas transportation data and gas meter operating environment data. The gas transportation data may at least include a flow rate, a flow velocity, a pressure, etc. and the gas meter operating environment data may at least include an ambient temperature, etc. For example, the operating feature vector $f_{A1}$ of a gas meter $A_1$ associated with a current gas meter $A_0$ may be expressed as $f_{A1} \times (D_{A1}, E_{A1})$, where $D_{A1}$ denotes the gas transportation data of the associated gas meter $A_1$, and $E_A t$ denotes the operating environment data of the associated gas meter $A_1$. The operating feature vector $f_{A2}$ of a gas meter $A_2$ associated with the current gas meter $A_0$ may be expressed as $f_{A2} = (D_{A2}, E_{A2})$, where $D_{A2}$ denotes the gas transportation data of the associated gas meter $A_2$, and $E_{A2}$ denotes the operating environment data of the associated gas meter $A_2$.

In some embodiments, the determining the data update priority of the gas meter based on the active data may also include: determining a total active feature 440 of a plurality of gas meter management operations through a preset algorithm based on the active feature 420 and the associated active feature 430.

In some embodiments, the total active feature may include the active feature of the gas meter and the associated active feature of the associated gas meter.

The preset algorithm may be a preset specific manner for calculating the total active feature. In some embodiments, the total active feature may be calculated by performing weighted summation on the active feature of the gas meter and the associated active feature of the associated gas meter.

The total active feature may be determined through weighted summation calculation based on the active feature of the gas meter and the associated active feature of the associated gas meter.

In some embodiments, a weight corresponding to the active feature of the current gas meter may need to be greater than a weight corresponding to the associated active feature. For example, the weight corresponding to the active feature of the current gas meter may be a value greater than 0.5, which may be set according to actual needs.

In some embodiments, the weight corresponding to the associated active feature of the associated gas meter may be determined based on a distance between an operating feature vector of the associated gas meter and an operating feature vector of the current gas meter. Specifically, the distances between the operating feature vector of the associated gas meter $A_1, A_3, \ldots,$ and $A_n$ and the operating feature vector of the current gas meter may be expressed as $L_1, L_3, \ldots,$ and $L_n$. If values of $L_1, L_3, \ldots,$ and $L_n$ decrease sequentially, the weights $W_1, W_3, \ldots,$ and $W_n$ of the corresponding gas meters gradually increase. The smart gas management platform may assign the weights of the associated gas meters based on an arithmetic progression. For example, if the weight of the current gas meter is set to 0.6, a sum $\Sigma_1{}^n W_n$ of the weights of all the associated gas meters is equal to 0.4, and the smart gas management platform may determine a tolerance of the arithmetic progression based on a count of associated gas meters.

The total active feature includes the active feature of each operation of the current gas meter and the active feature of each operation of the associated gas meter. In some embodiments, the total active feature $(f_i', t_i')$ may be expressed as $(f_i', t_i') = \Sigma W j \times (f_{ij}, t_{ij})$, where $W j$ denotes a weight of a gas meter $j$ (i.e., the current gas meter or the associated gas meter), and $(f_{ij}, t_{ij})$ denotes an active feature of an $i^{th}$ type of operation of the gas meter $j$ (i.e., the current gas meter or the associated gas meter).

In some embodiments, the data update priority is determined based on the total active feature and the importance degree 450 of the gas meter management operation. For example, the priority may be determined by a preset rule based on the total active feature of the operations and the importance degrees of the operations. For example, the preset rule may be determined based on $R = \Sigma P_i \times f_i'/t_i'$, where P denotes the importance degree of the operation, i denotes the operation type number, f' denotes a frequency feature of the total active feature of generating each operation, and t' denotes the time interval feature in the total active feature of the operation. In some embodiments, the priority of the current gas meter may be updated based on the calculated priority R.

In some embodiments of the present disclosure, the priority of the current gas meter is calculated in conjunction with the active feature of the associated gas meter, and the active feature of the associated gas meter may indicate that the gas meter of the same batch or in the same region faces a same or similar problem, so that the current gas meter data update priority may be determined more accurately, thereby enabling the system to more accurately push information that the user expects to want to receive.

Since the active feature of the associated gas meter may indicate that gas meter of the same batch or in the same region faces the same or similar problem, the traceability information of the associated gas meter may be updated in time for subsequent access to the relevant information, thereby improving the efficiency of the system.

Figure 5:
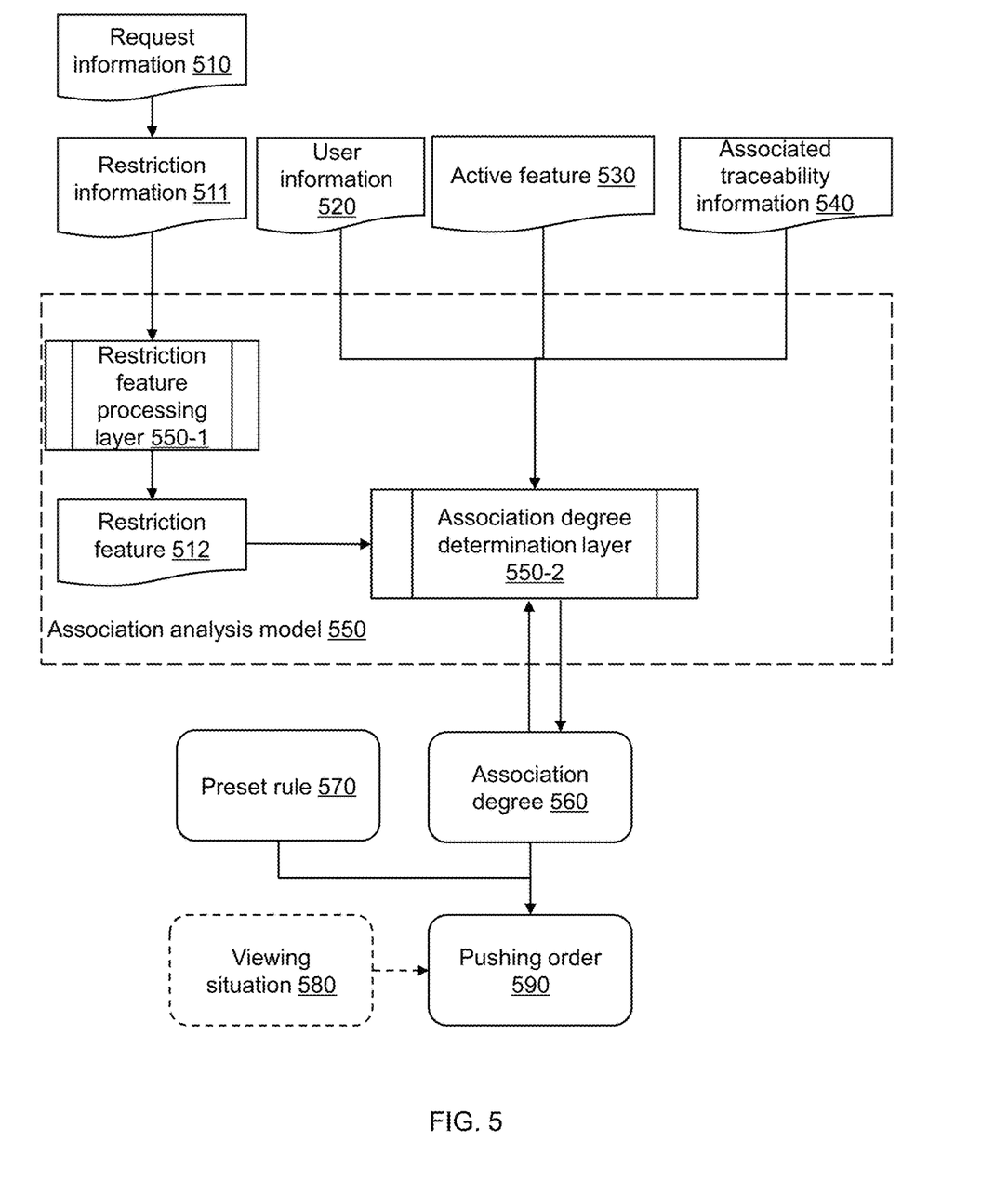
FIG. 5 is a schematic diagram of pushing associated traceability information according to some embodiments of the present disclosure.

FIG. 5 is a schematic diagram of pushing associated traceability information according to some embodiments of the present disclosure. As shown in FIG. 5, the pushing the associated traceability information may include the following descriptions.

In some embodiments, a smart gas device management platform may determine an association degree between the associated traceability information 540 and the request information 510 based on the request information 510, determine a pushing order 590 of at least one piece of associated traceability information based on the association degree 560; and push the at least one piece of associated traceability information to the user based on the pushing order.

More descriptions regarding the request information and the associated traceability information may be found in FIG. 2 and the relevant descriptions thereof.

The association degree 560 refers to a matching degree between the associated traceability information 540 and the request information 510. In some embodiments, the higher the association degree of the associated traceability information, the higher the matching degree between the associated traceability information and the request information, and the higher the likelihood that the user needs the traceability information.

In some embodiments, the association degree 560 may be represented by a numerical value, a letter, etc. For example, a numerical value of 1-10 may be used to indicate the association degree of the traceability information. The greater the value, the higher the association degree.

In some embodiments, the association degree 560 may be determined based on historical data. For example, the association degree may be determined based on a count of times a historical user views various types of traceability information under similar user request information in the historical data. The more the times the historical user views a certain type of traceability information, the greater the possibility that the type of traceability information may be the traceability information required by the user, and the higher the association degree of the type of traceability information may need to be.

In some embodiments, the smart gas device management platform may obtain restriction information 511 in the request information. The smart gas device management platform may determine the association degree 560 between the associated traceability information and the request information through an association analysis model 550 based on the restriction information 511, user information 520, an active feature 530 of a gas meter, and the associated traceability information 540.

The restriction information 511 refers to relevant information in the request information that is used to limit the traceability information. For example, if the request information indicates that this request is for maintenance by maintenance personnel, the restriction information is maintenance-related information. As another example, if the request information indicates that this request is for handling counter faults, the restriction information is information related to handling counter faults.

More descriptions regarding the user information, the active feature, and the associated traceability information may be found in FIGS. 2 and 4 and related descriptions thereof.

In some embodiments, the association analysis model 550 is a machine learning model. For example, the association analysis model may include a Deep Neural Network (DNN) model, etc.

In some embodiments, the association analysis model may include a restriction feature processing layer 550-1 and an association degree determination layer 550-2.

An input of the restriction feature processing layer 550-1 may include the restriction information 511, and an output of the restriction feature processing layer 550-1 may include a restriction feature 512. In some embodiments, the restriction feature 512 output by the restriction feature processing layer 550-1 may be used as an input of the association degree determination layer 550-2.

The input of the association degree determination layer 550-2 may include the restriction feature 512, the user information 520, the active feature 530, and the associated traceability information 540, and an output of the association degree determination layer 550-2 may include the association degree 560 of the association degree traceability information.

The restriction feature 512 refers to a feature related to the restriction information. In some embodiments, the restriction feature 512 may include a feature extracted from the restriction information with respect to a restriction such as a time, a position, or a request type.

In some embodiments, the restriction feature processing layer 550-1 and the association degree determination layer 550-2 may be obtained through joint training of a plurality of first training samples with labels.

In some embodiments, the first training sample(s) may include historical restriction information, historical user information, a historical active feature, and historical associated traceability information. The historical active feature refers to an active feature of the gas meter at a certain time period in history corresponding to the training sample. In some embodiments, the first training sample(s) may be obtained based on historical data.

In some embodiments, the label(s) may be determined based on score(s) of the associated traceability information from the historical user. For example, if the user request information indicates that the purpose of obtaining the traceability information is for reference in gas meter maintenance, the maintenance personnel may score based on a degree to which the associated traceability information is helpful for the gas meter maintenance, and an average of the scores of the multiple maintenance personnel is used as the association degree label. The score may be a value between 1 and 10. The larger the value, the higher the degree to which the associated information is helpful.

In some embodiments, the process of joint training may include inputting the historical restriction information in the first training sample to an initial restriction feature processing layer to obtain an initial restriction feature output by the initial restriction feature processing layer; inputting the initial restriction feature outputted by the initial restriction feature processing layer as the training sample, the historical user information, the historical active feature, and the historical associated traceability information in the first training sample into the initial association degree determination layer; and constructing a loss function based on output results of the initial association degree determination layer and the labels, synchronously updating parameters of the initial restriction feature processing layer and the initial association degree determination layer, and obtaining a trained association analysis model through the parameter updating.

In some embodiments of the present disclosure, the restriction information is processed by the restriction feature processing layer, which may process the request information with different counts and formats input by the user into a same format, thereby improving the efficiency of determining the association degree using the association analysis model. At the same time, the association degree of the associated traceability information is determined using the association analysis model, which may improve the accuracy of pushing the associated traceability information, thereby more accurately pushing the required information to the user and improving the usage efficiency and the usage experience of the user.

In some embodiments, the smart gas device management platform may update the association degree based on a viewing situation of the at least one piece of association degree traceability information.

In some embodiments, the viewing situation may be a situation in which the user clicks on the associated traceability information, a length of time the user stays on an interface of the associated traceability information, etc.

In some embodiments, the smart gas device management platform may update the association degree based on the situation in which the user clicks on the associated traceability information. The more times the user views the associated traceability information, the higher the association degree of the associated traceability information is. For example, when the user clicks once to view a certain piece of the associated traceability information, the association degree of the type of associated traceability information may be accordingly increased, for example, the association degree of a preset unit value of the type of associated traceability information may be accordingly increased. The preset unit value may be 0.1, 0.2, 0.5, etc.

In some embodiments, the smart gas device management platform may update the association degree based on the length of time the user stays on the interface of the association degree traceability information. For example, when the length of time the user stays on an interface of a certain piece of associated traceability information longer than a preset length of time, the association degree of the associated traceability information may be accordingly increased, for example, the associated degree of a preset unit value of the type of associated traceability information may be accordingly increased. The preset unit value may be 0.1, 0.2, 0.5, etc., and the preset length of time may be 10 s, 20 s, etc.

In some embodiments, the smart gas device management platform 130 may update the association analysis model based on the updated association degree.

In some embodiments, the smart gas device management platform may perform enhanced training on the association analysis model based on the updated association degree as a training label. Specifically, the updated association degree may be used as the training label, and associated traceability information, restriction information, user information, and gas meter active feature corresponding to the updated association degree may be respectively inputted as new training samples into a current restriction feature processing layer and a current association degree determination layer for enhanced training. The training process is similar to training the initial restriction feature processing layer and the initial association degree determination layer, which may be found above.

In some embodiments, the smart gas device management platform may determine the pushing order 590 of the at least one piece of the associated traceability information based on the association degree.

The pushing order refers to an order in which the associated traceability information is presented to the user in a user interface.

In some embodiments, the smart gas device management platform 130 may determine the pushing order through a preset rule 570 according to the association degree. For example, the preset rule may be that the pushing order is determined according to an order of size of association degree in descending order, i.e., the greater the association degree of the associated traceability information is, the earlier the associated traceability information is pushed, and the smaller the association degree of the associated traceability information is, the later the associated traceability information is pushed.

In some embodiments, the smart gas device management platform may push the at least one associated traceability information to the user based on the pushing order.

In some embodiments, the smart gas device management platform may determine the pushing order 590 through the preset rule 570 based on the association degree and push the associated traceability information to the user based on the pushing order 590; and dynamically adjust the pushing order 590 based on the viewing situation 580 of the associated traceability information of the user.

The preset rule refers to a preset manner for determining the pushing order. In some embodiments, the preset rule is related to the size of the association degree.

The size of the association degree refers to a size of a numerical value of the association degree. In some embodiments, the smaller the numerical value of the association degree, the smaller the proportion of it being presented in a push interface; the larger the numerical value of the association degree, the larger the proportion of it being presented in the push interface. The push interface refers to an interface that is pushed to the user for viewing.

In some embodiments, the preset rule may be that the pushing order may be proportionally determined based on the association degree. The higher the association degree of the associated traceability information, the greater the proportion of the associated traceability information to total pushed information during pushing. For example, if a push proportion is determined to be 9:1, when the pushing order is determined, 90% of the interface is used to display the associated traceability information with a relatively high association degree, and 10% of the interface is used to display the associated traceability information with a relatively low association degree.

In some embodiments, the smart gas device management platform may dynamically adjust the pushing order based on the viewing situation of the associated traceability information of the user. For example, for the associated traceability information that is viewed or clicked on by the user a large count of times, the association degree of the type of associated traceability information may be increased in real time, and the display of the association degree of the type of associated traceability information may be increased dynamically in a next page based on the updated association degree and the preset rule. As another example, for the associated traceability information that the user does not stay at all when viewing the interface, the association degree of the type of associated traceability information may be decreased, and the display of the type of associated traceability information may be dynamically decreased on the next page according to the updated association degree and the preset rule.

In some embodiments of the present disclosure, the association degree traceability information is pushed proportionally, which may test a preference of the user, thereby avoiding inefficient pushing due to inaccurate association degree setting.

In some embodiments of the present disclosure, the pushing order is determined based on the respective association degree of the associated traceability information, which improves the accuracy of the pushed information, so that the user can efficiently and accurately obtain the needed relevant information and the usage efficiency and usage experience of the user can be improved.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, unless explicitly stated in the claims, the order of processing elements and sequences, the use of alphanumeric, or the use of other names described in the present disclosure is not intended to limit the order of the processes and methods of the present disclosure. While the above disclosure discusses some presently believed useful embodiments of the invention by way of various examples, it is to be understood that such details are for purposes of illustration only and that the appended claims are not limited to the disclosed embodiments, but on the contrary, the claims are intended to cover all modifications and equivalent combinations that come within the spirit and scope of the embodiments of the present disclosure. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this approach of disclosure does not imply that the features required by the present disclosure are more than the features recited in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each patent, patent application, patent application publication, and other material, such as article, book, specification, publication, document, etc., cited in the present disclosure is hereby incorporated by reference in its entirety. Historical application documents that are inconsistent with or conflict with the content of the present disclosure are excluded, and documents (currently or later appended to the present disclosure) that limit the broadest scope of the claims of the present disclosure are excluded. It should be noted that if there is any inconsistency or conflict between the descriptions, definitions, and/or terms used in the accompanying materials of the present disclosure and the contents of the present disclosure, the descriptions, definitions, and/or terms used in the present disclosure shall prevail.

Finally, it should be understood that the embodiments described in the present disclosure are only configured to illustrate the principles of the embodiments of the present disclosure. Other modifications are also possible within the scope of the present disclosure. Therefore, as an example and not a limitation, alternative configurations of the embodiments of the present disclosure may be regarded as consistent with the teaching of the present disclosure. Correspondingly, the embodiments of the present disclosure are not limited to the embodiments clearly introduced and described in the present disclosure.

What is claimed is:

1. A method for gas meter management based on a smart gas platform, wherein the method is implemented based on a smart gas device management platform of an Internet of Things (IoT) system for smart gas meter management, and the method comprises:
   obtaining traceability information and user information of a gas meter, the traceability information at least including active data and the active data being related to a gas meter management operation performed on the gas meter;
   in response to the active data satisfying a preset condition, generating warning information and sending the warning information to at least one associated platform of the IoT system for smart gas meter management;
   in response to receiving request information of a user, retrieving associated traceability information of the gas meter based on the request information, the obtained traceability information, and the user information; and
   pushing the associated traceability information to the user.

2. The method according to claim 1, wherein the obtained traceability information is dynamically updated based on the smart gas device management platform; and
   the obtained traceability information is updated by a process including:
   determining a data obtaining cycle based on a data volume of historical traceability information of the gas meter;
   obtaining the active data of the gas meter based on the smart gas device management platform in conjunction with the data obtaining cycle; and
   updating the obtained traceability information based on the active data.

3. The method according to claim 2, wherein the updating the obtained traceability information based on the active data includes:
   determining a data update priority of the gas meter based on the active data; and
   updating the obtained traceability information of the gas meter based on the data update priority.

4. The method according to claim 3, wherein the determining the data update priority of the gas meter based on the active data includes:
   extracting an active feature in the active data based on the active data, the active feature characterizing a time feature of the gas meter management operation; and
   determining the data update priority of the gas meter based on the active feature.

5. The method according to claim 4, wherein the data update priority is also related to an associated active feature of an associated gas meter, and the associated active feature characterizes a time feature of a gas meter management operation for the associated gas meter; and     the determining the data update priority of the gas meter based on the active data also includes:

determining a total activity feature of a plurality of gas meter management operations through a preset algorithm based on the extracted active feature and the associated active feature; and         determining the data update priority based on the total activity feature and an importance degree of the gas meter management operation performed on the gas meter.

6. The method according to claim 1, wherein the pushing the associated traceability information to the user includes:

determining an association degree between the associated traceability information and the request information based on the request information;

determining a pushing order of the associated traceability information based on the association degree; and     pushing the associated traceability information to the user based on the pushing order.

7. The method according to claim 6, wherein the determining the association degree between the associated traceability information and the request information based on the request information includes:

obtaining restriction information in the request information; and     determining the association degree between the associated traceability information and the request information through an association analysis model based on the restriction information, the user information, an active feature of the gas meter, and the associated traceability information, wherein     the association analysis model is a machine learning model.

8. The method according to claim 7, wherein the association degree is updated based on a viewing situation of the associated traceability information; and     the method further comprises:

updating the association analysis model based on the updated association degree.

9. The method according to claim 6, wherein the determining the pushing order of the associated traceability information based on the association degree includes:

determining the pushing order through a preset rule according to the association degree and pushing the associated traceability information to the user based on the pushing order, the preset rule being related to the association degree; and     dynamically adjusting the pushing order based on a viewing situation of the associated traceability information.

10. A non-transitory computer-readable storage medium storing computer instructions, wherein when reading the computer instructions in the non-transitory computer-readable storage medium, a computer executes a method for gas meter management based on a smart gas platform according to claim 1.

11. An Internet of Things (IoT) system for smart gas meter management, wherein the IoT system comprises a smart gas user platform, a smart gas service platform, a smart gas device management platform, a smart gas sensor network platform, and a smart gas object platform;

the smart gas device management platform is configured to:

obtain traceability information and user information of a gas meter, the traceability information at least including active data and the active data being related to a gas meter management operation performed on the gas meter;

in response to the active data satisfying a preset condition, generate warning information and send the warning information to at least one associated platform of the IoT system for smart gas meter management;

in response to receiving request information of a user, retrieve associated traceability information of the gas meter based on the request information, the obtained traceability information, and the user information; and     push the associated traceability information to the user.

12. The IoT system according to claim 11, wherein the smart gas device management platform includes a smart gas indoor device management sub-platform, a smart gas pipeline network device management sub-platform, and a smart gas data center; and     the smart gas device management platform interacts with the smart gas service platform and the smart gas sensor network platform through the smart gas data center.

13. The IoT system according to claim 12, wherein the obtained traceability information is dynamically updated based on the smart gas device management platform; and     the smart gas device management platform is further configured to:

determine a data obtaining cycle based on a data volume of historical traceability information of the gas meter;

obtain the active data of the gas meter based on the smart gas device management platform in conjunction with the data obtaining cycle; and     update the obtained traceability information based on the active data.

14. The IoT system according to claim 13, wherein the smart gas device management platform is further configured to:

determine a data update priority of the gas meter based on the active data; and     update the obtained traceability information of the gas meter based on the data update priority.

15. The IoT system according to claim 14, wherein the smart gas device management platform is further configured to:

extract an active feature in the active data based on the active data, the active feature characterizing a time feature of the gas meter management operation; and     determine the data update priority of the gas meter based on the active feature.

16. The IoT system according to claim 15, wherein the data update priority is also related to an associated active feature of an associated gas meter, and the associated active feature characterizes a time feature of a gas meter management operation for the associated gas meter; and     the smart gas device management platform is further configured to:

determine a total active feature of a plurality of gas meter management operations through a preset algorithm based on the extracted active feature and the associated active feature; and     determine the data update priority based on the total active feature and an importance degree of the gas meter management operation performed on the gas meter.

17. The IoT system according to claim 12, wherein the smart gas device management platform is further configured to:

determine an association degree between the associated traceability information and the request information based on the request information;

determine a pushing order of the associated traceability information based on the association degree; and push the associated traceability information to the user based on the pushing order.

18. The IoT system according to claim 17, wherein the smart gas device management platform is further configured to:

obtain restriction information in the request information; and determine the association degree between the associated traceability information and the request information through an association analysis model based on the restriction information, the user information, an active feature of the gas meter, and the associated traceability information, wherein the association analysis model is a machine learning model.

19. The IoT system according to claim 18, wherein the association degree is updated based on a viewing situation of the associated traceability information; and the smart gas device management platform is further configured to:

update the association analysis model based on the updated association degree.

20. The IoT system according to claim 17, wherein the smart gas device management platform is further configured to:

determine the pushing order through a preset rule according to the association degree and push the associated traceability information to the user based on the pushing order, the preset rule being related to the association degree; and dynamically adjust the pushing order based on a viewing situation of the associated traceability information.

* * * * *